(12) United States Patent
Anderson et al.

(10) Patent No.: US 11,642,888 B2
(45) Date of Patent: May 9, 2023

(54) FLUID EJECTION DEVICES WITH INDICATORS

(71) Applicant: HEWLETT-PACKARD DEVELOPMENT COMPANY, L.P., Spring, TX (US)

(72) Inventors: Daryl E Anderson, Corvallis, OR (US); James R Przybyla, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 334 days.

(21) Appl. No.: 16/612,821

(22) PCT Filed: Jul. 11, 2017

(86) PCT No.: PCT/US2017/041512
§ 371 (c)(1),
(2) Date: Nov. 12, 2019

(87) PCT Pub. No.: WO2019/013763
PCT Pub. Date: Nov. 7, 2019

(65) Prior Publication Data
US 2021/0276331 A1    Sep. 9, 2021

(51) Int. Cl.
*B41J 3/46* (2006.01)
*B41J 2/165* (2006.01)
*B41J 25/34* (2006.01)
*B41J 29/393* (2006.01)
*G06F 3/12* (2006.01)

(52) U.S. Cl.
CPC .............. *B41J 2/165* (2013.01); *B41J 3/46* (2013.01); *B41J 25/34* (2013.01); *B41J 29/393* (2013.01); *G06F 3/1229* (2013.01); *B41J 2002/1657* (2013.01); *B41J 2202/20* (2013.01)

(58) Field of Classification Search
CPC .. B41J 2/165; B41J 29/393; B41J 3/46; G06F 3/1229
See application file for complete search history.

(56) References Cited

U.S. PATENT DOCUMENTS

| | | |
|---|---|---|
| 5,940,097 A | 8/1999 | Imai |
| 6,146,037 A | 11/2000 | Schuh et al. |
| 6,378,977 B1 | 4/2002 | Gompertz |

(Continued)

FOREIGN PATENT DOCUMENTS

| | | |
|---|---|---|
| EP | 1464496 | 10/2004 |
| JP | 2002301829 A | 10/2002 |

(Continued)

OTHER PUBLICATIONS

Webpage. Using the Printer Utilities. Seiko Epson Corporation < https://files.support.epson.com/htmldocs/pro4k_/pro4k_rf/softm_7.htm >.

*Primary Examiner* — Sharon Polk
(74) *Attorney, Agent, or Firm* — Foley & Lardner LLP

(57) ABSTRACT

One example of a fluid ejection system includes a plurality of fluid ejection devices, a corresponding plurality of indicators, an operator interface, and a controller. Each indicator is on a corresponding fluid ejection device. The operator interface is to select a fluid ejection device. The controller is to turn on the corresponding indicator for the selected fluid ejection device.

15 Claims, 3 Drawing Sheets

(56) References Cited

U.S. PATENT DOCUMENTS

| | | | |
|---|---|---|---|
| 6,543,875 B2 | 4/2003 | Gomez et al. | |
| 6,658,218 B2 | 12/2003 | Krolczyk et al. | |
| 9,352,573 B1 * | 5/2016 | Turgeman | B41J 2/1752 |
| 2004/0183848 A1 * | 9/2004 | Hasseler | B41J 2/17566 |
| | | | 347/19 |
| 2008/0047448 A1 | 2/2008 | Cocklin et al. | |
| 2013/0262251 A1 | 10/2013 | Wan et al. | |
| 2019/0344560 A1 * | 11/2019 | Drogo | B41J 2/0451 |

FOREIGN PATENT DOCUMENTS

| | | |
|---|---|---|
| RU | 129673 U1 | 12/2012 |
| RU | 2623797 C2 | 7/2015 |
| WO | WO-2007/015230 | 2/2007 |

* cited by examiner

FLUID EJECTION DEVICES WITH INDICATORS

BACKGROUND

An inkjet printing system, as one example of a fluid ejection system, may include a printhead, an ink supply which supplies liquid ink to the printhead, and an electronic controller which controls the printhead. The printhead, as one example of a fluid ejection device, ejects drops of ink through a plurality of nozzles or orifices and toward a print medium, such as a sheet of paper, so as to print onto the print medium. In some examples, the orifices are arranged in at least one column or array such that properly sequenced ejection of ink from the orifices causes characters or other images to be printed upon the print medium as the printhead and the print medium are moved relative to each other.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Determining which fluid ejection device (e.g., printhead assembly or pen) to replace or service in a fluid ejection system (e.g., printer or press such as an inkjet printing system) with multiple fluid ejection devices can be difficult, leading to the wrong fluid ejection device being replaced or serviced. If the wrong fluid ejection device is replaced or serviced, the customer suffers additional costs and unplanned downtime.

Accordingly, disclosed herein is a fluid ejection system including a plurality of fluid ejection devices and an indicator light on or proximate each fluid ejection device. An operator of the fluid ejection system may select one of the plurality of fluid ejection devices using an operator interface (e.g., graphical user interface). The indicator light on or proximate the selected fluid ejection device is then turned on to enable the operator to easily identify the selected fluid ejection device. By accurately identifying the selected fluid ejection devices, the fluid ejection devices may be correctly replaced, serviced, or otherwise examined, thereby reducing the costs and downtime resulting from replacing or servicing the wrong fluid ejection devices.

Figure 1:
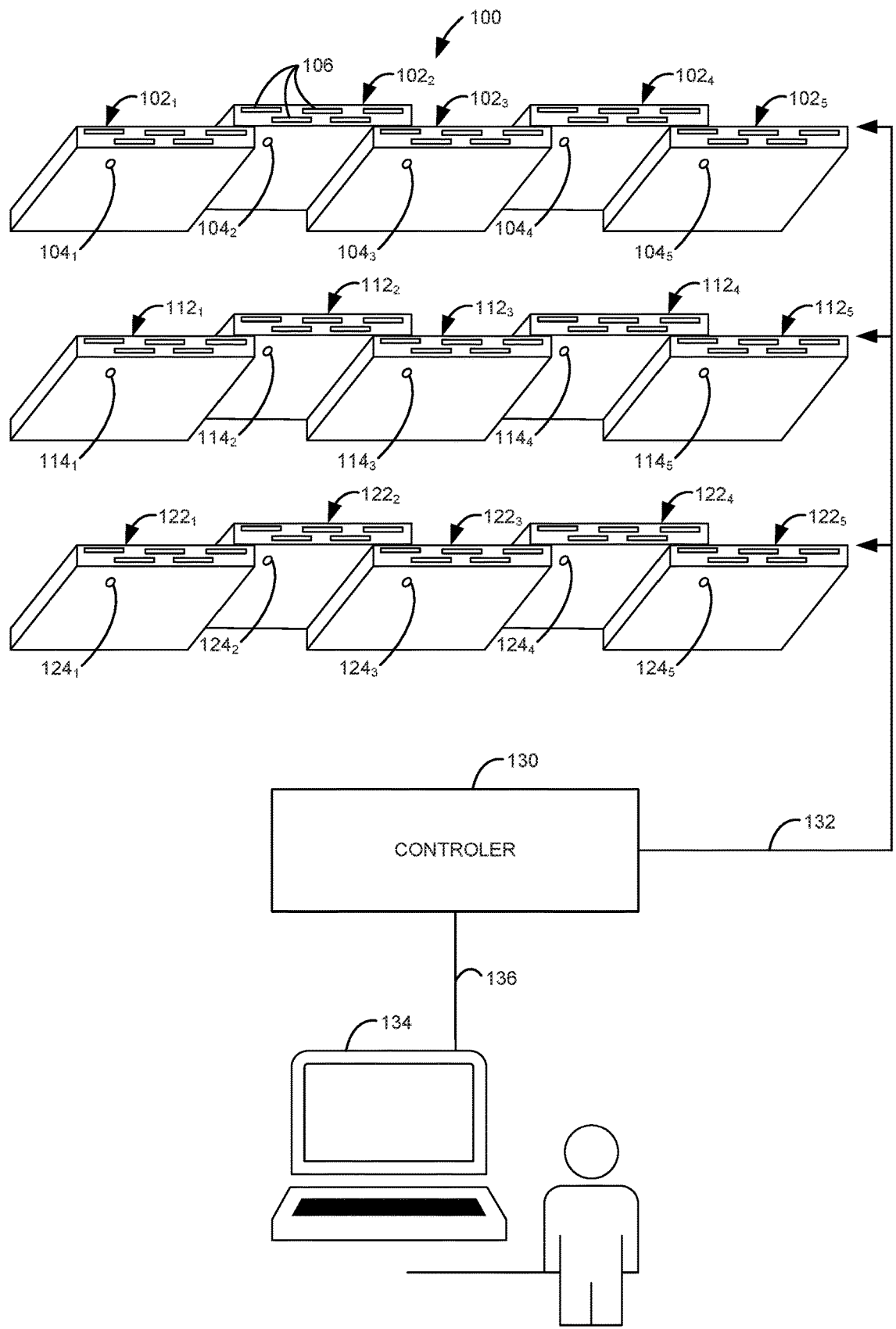
FIG. 1 is a schematic diagram illustrating one example of a fluid ejection system.

FIG. 1 is a schematic diagram illustrating one example of a fluid ejection system 100. Fluid ejection system 100 includes a first plurality of fluid ejection devices $102_1$ to $102_5$, a second plurality of fluid ejection devices $112_1$ to $112_5$, a third plurality of fluid ejection devices $122_1$ to $122_5$, a controller 130, and an operator interface 134. Controller 130 is coupled to each fluid ejection device $102_1$ to $102_5$, $112_1$ to $112_5$, and $122_1$ to $122_5$ through a communication path 132. Operator interface 134 is coupled to controller 130 through a communication path 136. In one example, fluid ejection system 100 includes an inkjet printing system and each fluid ejection device $102_1$ to $102_5$, $112_1$ to $112_5$, and $122_1$ to $122_5$ includes a printhead assembly or pen.

Each fluid ejection device $102_1$ to $102_5$, $112_1$ to $112_5$, and $122_1$ to $122_5$ includes an indicator $104_1$ to $104_5$, $114_1$ to $114_5$, and $124_1$ to $124_5$ on the fluid ejection device, respectively. In one example, each indicator includes a light emitting diode (LED). The indicator for each fluid ejection device may be arranged on a side surface of each fluid ejection device as shown in FIG. 1 or arranged at another suitable location on each fluid ejection device so long as the indicator is visible by an operator of fluid ejection system 100.

Each fluid ejection device $102_1$ to $102_5$, $112_1$ to $112_5$, and $122_1$ to $122_5$ also includes nozzles arranged in columns and/or rows, as indicated for example at 106, to eject fluid drops. In one example, fluid ejection devices $102_1$ to $102_5$ eject fluid of a first color, fluid ejection devices $112_1$ to $112_5$ eject fluid of a second color, and fluid ejection devices $122_1$ to $122_5$ eject fluid of a third color to provide a full color fluid ejection system 100. While fluid ejection system 100 illustrated in FIG. 1 includes three rows with each row including five fluid ejection devices, in other examples, fluid ejection system 100 may include any suitable number of rows of fluid ejection devices with each row including any suitable number of fluid ejection devices.

Operator interface 134 enables a user to select a fluid ejection device $102_1$ to $102_5$, $112_1$ to $112_5$, and $122_1$ to $122_5$ that the user wants to replace, service, or otherwise accurately identify. In one example, operator interface 134 is implemented by a computing device and includes a graphical user interface. In other examples, the operator interface may be a control panel with switches, buttons, dials, and/or other suitable input devices for selecting a desired fluid ejection device.

Controller 130 turns on the corresponding indicator $104_1$ to $104_5$, $114_1$ to $114_5$, and $124_1$ to $124_5$ for the selected fluid ejection device $102_1$ to $102_5$, $112_1$ to $112_5$, and $122_1$ to $122_5$. Controller 130 may include a central processing unit (CPU), a microprocessor, an application specific integrated circuit (ASIC), and/or other suitable logic devices. Controller 130 receives signals from operator interface 134 indicating which fluid ejection devices $102_1$ to $102_5$, $112_1$ to $112_5$, and $122_1$ to $122_5$ have been selected and activates the corresponding indicators $104_1$ to $104_5$, $114_1$ to $114_5$, and $124_1$ to $124_5$ for the selected fluid ejection devices.

Figure 2:
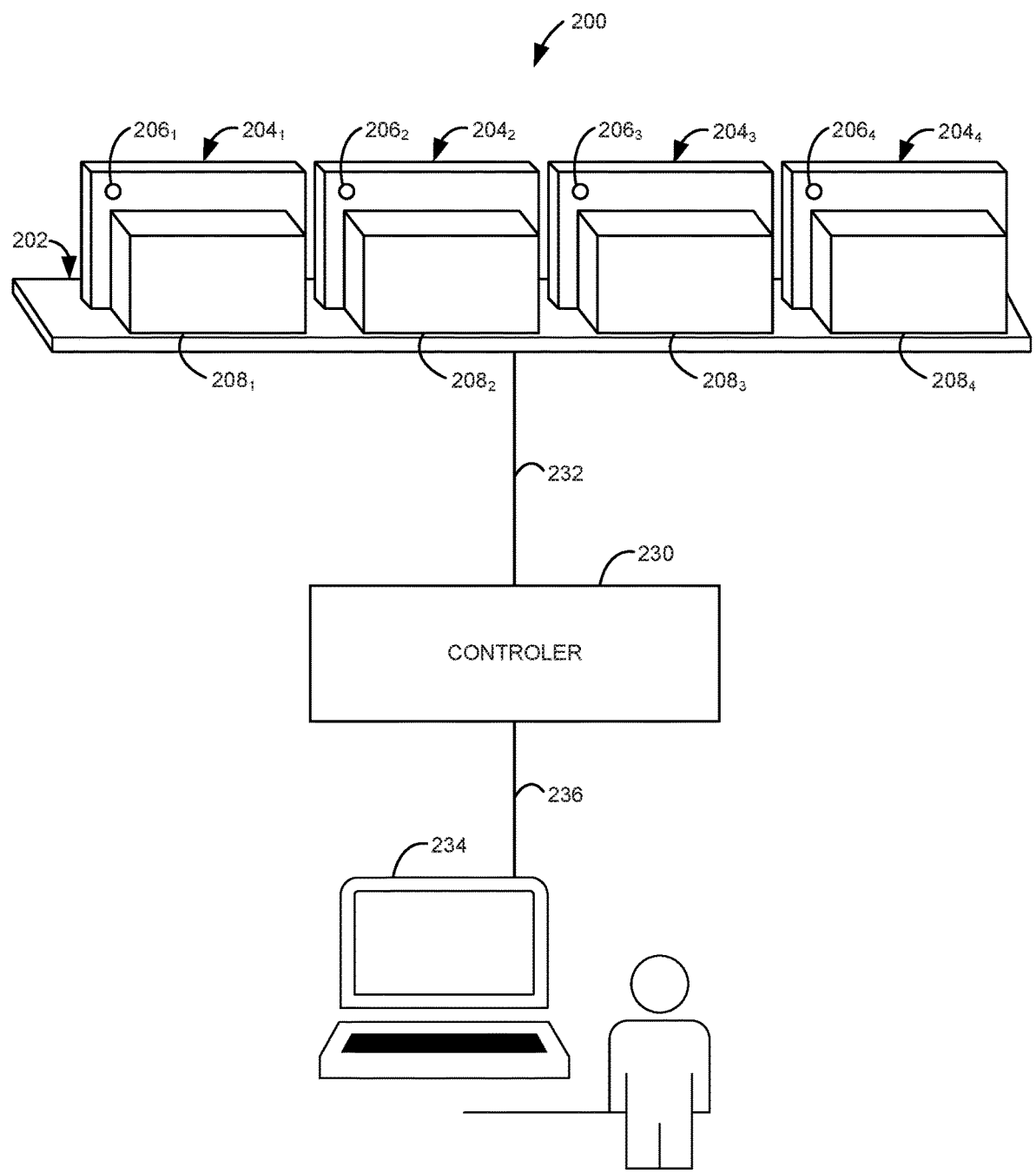
FIG. 2 is a schematic diagram illustrating another example of a fluid ejection system.

FIG. 2 is a schematic diagram illustrating another example of a fluid ejection system 200. Fluid ejection system 200 includes an assembly 202, a controller 230, and an operator interface 234. Assembly 202 includes a plurality of driver boards $204_1$ to $204_4$, a plurality of fluid ejection devices $208_1$ to $208_4$, and a corresponding plurality of indicators $206_1$ to $206_4$. Controller 230 is coupled to each driver board $204_1$ to $204_4$ through a communication path 232. Operator interface 234 is coupled to controller 230 through a communication path 236. In one example, fluid ejection system 200 includes an inkjet printing system and each fluid ejection device $208_1$ to $208_4$ includes a printhead assembly or pen.

Each fluid ejection device $208_1$ to $208_4$ includes nozzles (not shown) arranged in columns and/or rows to eject fluid drops. In this example, each fluid ejection device $208_1$ to $208_4$ is removably electrically coupled to a corresponding driver board $204_1$ to $204_4$. In this case, each indicator $206_1$ to $206_4$ is arranged on a corresponding driver board $204_1$ to $204_4$ proximate a corresponding fluid ejection device $208_1$ to $208_4$. In other examples, assembly 202 includes at least one driver board and each fluid ejection device is removably electrically coupled to the at least one driver board. In that case, each indicator $206_1$ to $206_4$ is located on the at least one driver board proximate the corresponding fluid ejection device $208_1$ to $208_4$ such that each fluid ejection device may be individually identified based on the indicators. In one example, each indicator includes a LED. The indicator for each fluid ejection device $208_1$ to $208_4$ may be arranged on a side surface of each driver board as shown in FIG. 2 or arranged at another suitable location on each driver board so long as the indicator is visible by an operator of fluid ejection system 200 and proximate the corresponding fluid ejection device $208_1$ to $208_4$ such that each fluid ejection device may be individually identified.

While assembly 202 includes one row of four fluid ejection devices in the example illustrated in FIG. 2, in other examples, assembly 202 may include any suitable number of rows of fluid ejection devices with each row including any suitable number of fluid ejection devices. In addition, while one assembly 202 is illustrated in FIG. 2, in other examples fluid ejection system 200 may include multiple assemblies 202 with each assembly including multiple fluid ejection devices.

Operator interface 234 enables a user to select a fluid ejection device $208_1$ to $208_4$ that the user wants to replace, service, or otherwise accurately identify. In one example, operator interface 234 is implemented by a computing device and includes a graphical user interface. In other examples, the operator interface may be a control panel with switches, buttons, dials, and/or other suitable input devices for selecting a desired fluid ejection device.

Controller 230 turns on the corresponding indicator $206_1$ to $206_4$ for the selected fluid ejection device $208_1$ to $208_4$. Controller 230 may include a CPU, a microprocessor, an ASIC, and/or other suitable logic devices. Controller 230 receives signals from operator interface 234 indicating which fluid ejection devices $208_1$ to $208_4$ have been selected and activates the corresponding indicators $206_1$ to $206_4$ for the selected fluid ejection devices.

Figure 3:
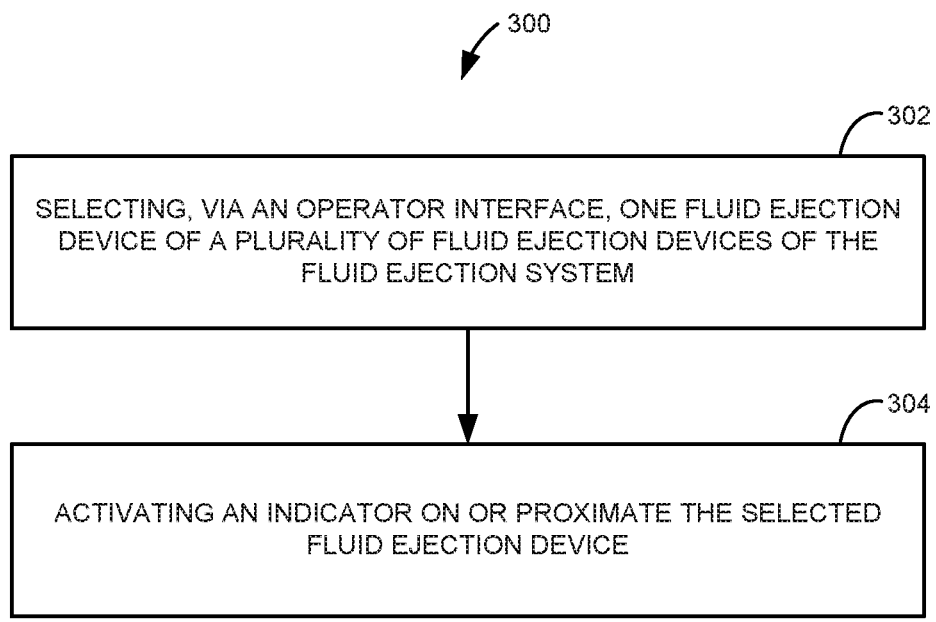
FIG. 3 is a flow diagram illustrating one example of a method for maintaining a fluid ejection system.

FIG. 3 is a flow diagram illustrating one example of a method 300 for maintaining a fluid ejection system, such as fluid ejection system 100 previously described and illustrated with reference to FIG. 1 or fluid ejection system 200 previously described and illustrated with reference to FIG. 2. In one example, the fluid ejection system includes an inkjet printing system. At 302, method 300 includes selecting, via an operator interface, one fluid ejection device of a plurality of fluid ejection devices of the fluid ejection system. In one example, selecting the one fluid ejection device includes selecting the one fluid ejection device via a graphical user interface. Selecting the one fluid ejection device may include selecting one printhead assembly of a plurality of printhead assemblies. At 304, method 300 includes activating an indicator on or proximate the selected fluid ejection device. In one example, activating the indicator includes turning on a light emitting diode.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A fluid ejection system comprising:
a plurality of fluid ejection devices;
a corresponding plurality of indicators, each indicator directly on a corresponding fluid ejection device;
an operator interface for a user of the fluid ejection system to select a fluid ejection device; and
a controller to turn on the corresponding indicator for the selected fluid ejection device.

2. The fluid ejection system of claim 1, wherein each indicator includes a light emitting diode.

3. The fluid ejection system of claim 1, wherein the operator interface includes a graphical user interface.

4. The fluid ejection system of claim 1, wherein each fluid ejection device includes a printhead assembly.

5. The fluid ejection system of claim 1, wherein the fluid ejection system includes an inkjet printing system.

6. A fluid ejection system comprising:
a plurality of fluid ejection devices;
a corresponding plurality of indicators, each indicator proximate a corresponding fluid ejection device;
an operator interface for a user of the fluid ejection system to select a fluid ejection device; and
a controller to turn on the corresponding indicator for the selected fluid ejection device.

7. The fluid ejection system of claim 6, further comprising:
at least one driver board;
wherein each fluid ejection device is removably electrically coupled to the at least one driver board, and
wherein each indicator is located on the at least one driver board.

8. The fluid ejection system of claim 6, wherein each indicator includes a light emitting diode.

9. The fluid ejection system of claim 6, wherein the operator interface includes a graphical user interface.

10. The fluid ejection system of claim 6, wherein each fluid ejection device includes a printhead assembly.

11. A method for maintaining a fluid ejection system, the method comprising:
selecting, by a user of the fluid ejection system via an operator interface, one fluid ejection device of a plurality of fluid ejection devices of the fluid ejection system; and
activating an indicator on or proximate the selected fluid ejection device.

12. The method of claim 11, wherein activating the indicator comprises turning on a light emitting diode.

13. The method of claim 11, wherein selecting the one fluid ejection device comprises selecting the one fluid ejection device via a graphical user interface.

14. The method of claim 11, wherein selecting the one fluid ejection device comprises selecting one printhead assembly of a plurality of printhead assemblies.

15. The method of claim 11, wherein the fluid ejection system includes an inkjet printing system.

* * * * *